(12) United States Patent
Sumida et al.

(10) Patent No.: US 7,696,883 B2
(45) Date of Patent: Apr. 13, 2010

(54) RESONANCE TAG, METHOD OF REVERSIBLY CHANGING RESONANCE CHARACTERISTICS OF RESONANCE CIRCUIT, AND CAPACITIVE ELEMENT

(75) Inventors: Takayuki Sumida, Kawasaki (JP); Tadahiko Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 11/665,483

(22) PCT Filed: Jan. 16, 2006

(86) PCT No.: PCT/JP2006/300906

§ 371 (c)(1),
(2), (4) Date: Apr. 16, 2007

(87) PCT Pub. No.: WO2006/075800

PCT Pub. Date: Jul. 20, 2006

(65) Prior Publication Data

US 2008/0088456 A1      Apr. 17, 2008

(30) Foreign Application Priority Data

Jan. 17, 2005    (JP)    ............................. 2005-009071

(51) Int. Cl.
*G08B 13/14*    (2006.01)

(52) U.S. Cl. ................ 340/572.5; 340/572.1; 340/10.5; 235/385

(58) Field of Classification Search ............. 340/572.5, 340/10.5, 572.1, 572; 235/285

See application file for complete search history.

(56) References Cited

U.S. PATENT DOCUMENTS

| | | | |
|---|---|---|---|
| 2002/0163434 A1* | 11/2002 | Burke | 340/572.7 |
| 2003/0005193 A1* | 1/2003 | Seroussi et al. | 710/107 |
| 2003/0169153 A1* | 9/2003 | Muller | 340/10.51 |
| 2005/0179551 A1* | 8/2005 | Lian et al. | 340/572.5 |
| 2006/0108416 A1 | 5/2006 | Hirai | |
| 2006/0109264 A1 | 5/2006 | Hirai et al. | |
| 2006/0125637 A1 | 6/2006 | Hirai et al. | |

FOREIGN PATENT DOCUMENTS

| | | |
|---|---|---|
| JP | 11-306311 | 11/1999 |
| JP | 2000-151580 | 5/2000 |
| JP | 2002-185271 | 6/2002 |
| JP | 2002-185281 | 6/2002 |
| JP | 2002-245429 | 8/2002 |
| JP | 2002-288749 | 10/2002 |
| JP | 2003-026331 | 1/2003 |
| JP | 2003-217039 | 7/2003 |
| JP | 2003-271912 | 9/2003 |

* cited by examiner

*Primary Examiner*—Davetta W Goins
*Assistant Examiner*—Ojiako Nwugo
(74) *Attorney, Agent, or Firm*—Fitzpatrick, Cella, Harper & Scinto

(57) ABSTRACT

In a resonance tag provided with a resonance circuit composed of a capacitive element and an inductive element, the capacitive element is characterized by having a condition under which the capacitance of the capacitive element is reversibly changed by a voltage applied to the resonance circuit and anther condition under which the capacitance of the capacitive element is irreversibly changed by another voltage applied to the resonance circuit.

8 Claims, 6 Drawing Sheets

FRONT SURFACE

BACK SURFACE

FIG. 6A ically changing the capacitance of a capacitive element and resonance characteristic under a specific voltage condition by using a resonance tag composed of a resonance circuit including a capacitive element whose capacitance is reversibly changed by applying a voltage.

RESONANCE TAG, METHOD OF REVERSIBLY CHANGING RESONANCE CHARACTERISTICS OF RESONANCE CIRCUIT, AND CAPACITIVE ELEMENT

TECHNICAL FIELD

The present invention relates to a resonance tag, a method of non-contactly and reversibly changing the resonance characteristics of a resonance circuit and a capacitive element.

BACKGROUND ART

A conventional resonance tag is composed of a capacitor and a coil, and it has been used as shown below. First, a resonance tag attached to a large number of products displayed at stores, known as a so-called shoplifting preventing tag. When a product is dishonestly taken out from a store, it passes through a portion called a gate, and then the resonance tag attached to the product receives a transmitted electromagnetic wave from the gate, thereby causing the tag to resonate to reflect an electromagnetic wave with the same frequency. This allows detecting the product being taken out dishonestly, thereby preventing shoplifting.

When a product is purchased normally, on the other hand, the resonance function of the shoplifting preventing tag is inactivated by a tag inactivator installed for example on a register. Thus the tag does not reflect electromagnetic waves, so that a product can pass the gate without any problem.

The resonance tag is inactivated by applying a high voltage generated when the resonance tag is given a pulse wave or Joule heat accompanied by the high voltage to a dielectric layer of the capacitor to cause the dielectric breakdown of the dielectric layer, thereby short-circuiting a part of the wire of the resonance circuit (refer to, for example, Japanese Patent Application Laid-Open Nos. 2002-185281, 2003-217039, and 2002-288749).

Secondly, the resonance tag is used as a recording card such as a prepaid card. As a concrete example, there is a magnetic record card in which information is recorded by the change of the resonance characteristics of the resonance circuit, as disclosed in Japanese Patent Application Laid-Open No. H11-306311. This takes advantage of resonance-characteristic changing means disposed at a resonance circuit, to be more specific, the blowout of a fuse or the dielectric breakdown of an insulating material arranged between plates of a capacitor under a condition in which some electromagnetic waves are radiated.

Japanese Patent Application Laid-Open No. 2002-245429 discloses a method of carrying out sequential dielectric breakdown of capacitors by radiating each capacitor with electromagnetic waves satisfying some condition to change the combined capacitance of the capacitors and sequentially writing information allocated to each of the resonance frequencies, in a resonance tag including a resonance circuit formed by a plurality of capacitors and a coil which are connected in series. Further, Japanese Patent Application Laid-Open No. 2003-271912 proposes a tag provided with a plurality of such resonance circuits, for representing some specific information having a relative relation of the resonance characteristics of the circuits.

However, a principle that information is written in the conventional art described above is based upon an irreversible phenomenon of the blowout of a fuse or the complete dielectric breakdown of the dielectric layers inside capacitors. For this reason, information can be recorded only once. There lacks viewpoints about usages brought about by an intentional return of a resonant function or by a reversible change in resonance frequencies, that is, those about the manufacture of a reusable shoplifting preventing tag or information-rewritable card or ID tag.

DISCLOSURE OF THE INVENTION

Consequently, an object of the present invention is to provide a resonance tag, a method capable of reversibly changing resonance frequencies, and a capacitive element.

Research of the present inventors about the above objects has found voltage applying means capable of reversibly changing the capacitance of a capacitive element and resonance characteristic under a specific voltage condition by using a resonance tag composed of a resonance circuit including a capacitive element whose capacitance is reversibly changed by applying a voltage.

That is to say, the resonance tag according to the present invention is a resonance circuit consisting essentially of a capacitive element and an inductive element, characterized in that the capacitive element has a condition under which the capacitance of the capacitive element is reversibly changed by a voltage applied to the resonance circuit and another condition under which the capacitance of the capacitive element is irreversibly changed by another voltage applied to the resonance circuit.

From the viewpoint of controlling capacitance and preventing short circuit in manufacturing, it is preferable that the capacitive element is a capacitor and the capacitor is composed of a first electrode mounted on an insulating substrate, a dielectric layer provided on the first electrode, an insulating resin layer provided so as to cover at least the periphery of the first electrode and the dielectric layer, and a second electrode provided on the dielectric layer and the insulating resin layer.

It is preferable that the dielectric layer is an alumina thin film.

A method of reversibly changing the resonance characteristic of the resonance circuit consisting essentially of a capacitive element and an inductive element according to the present invention is characterized by including: a writing operation for changing the resonance characteristic from an initial state to another state by applying a voltage, a resetting operation for returning the change to the initial state by applying a voltage, and a detecting operation for detecting resonance characteristic performed at an applied voltage lower than voltages at which the writing and resetting operations are performed, wherein each of the applied voltages is set to a value at which the capacitance of the capacitive element is reversibly changed.

In addition, the capacitive element according to the present invention is characterized by having a condition under which a capacitance thereof is reversibly changed by an applied voltage and another condition under which capacitance is irreversibly changed by another applied voltage.

BEST MODE FOR CARRYING OUT THE INVENTION

First Embodiment

Figure 1A:
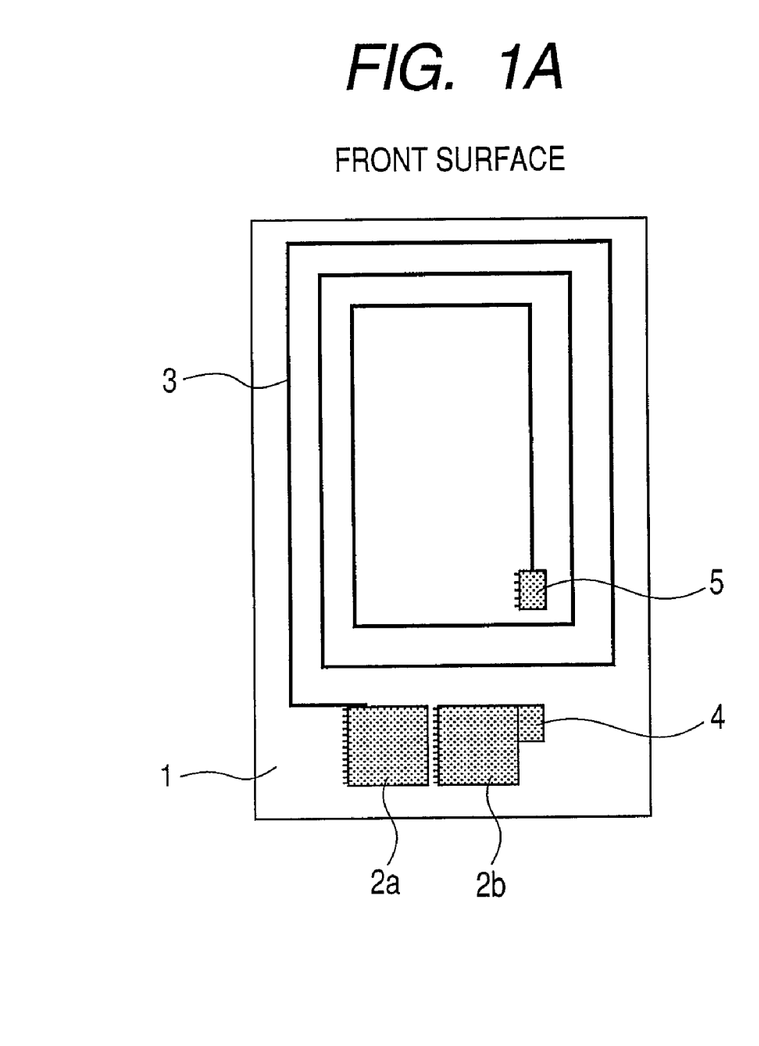
FIGS. 1A and 1B are schematic views showing the front and back surfaces of one example of a wiring pattern of a resonance tag.
Figure 1B:
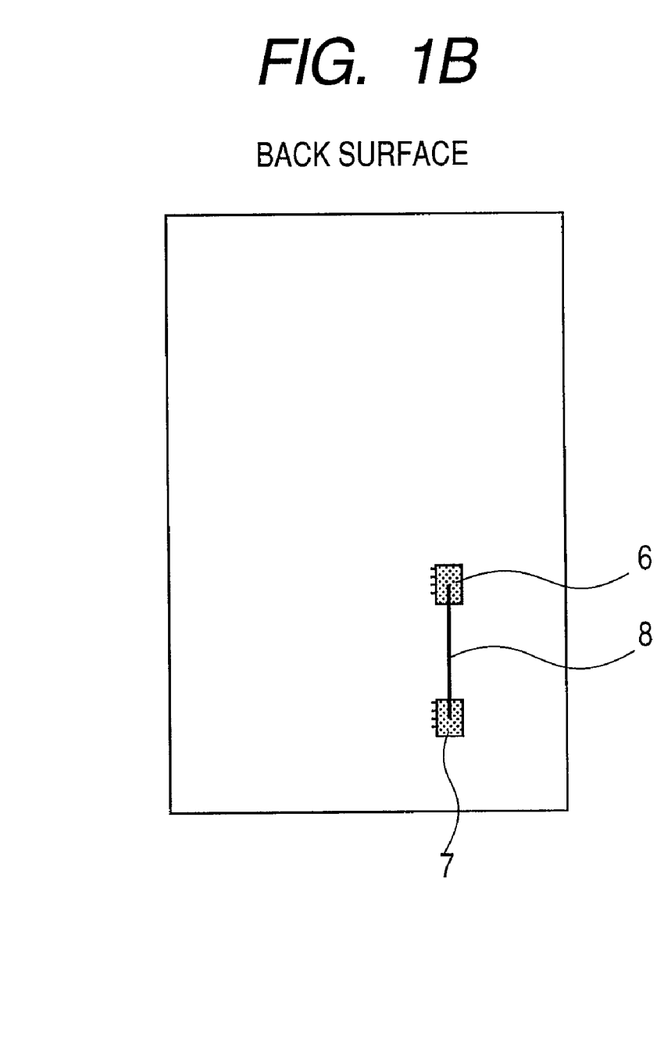

An embodiment in which a resonance tag composed of one coil and one capacitor is used is described with reference to FIGS. 1A and 1B. As shown in FIG. 1A, in the resonance tag of the present embodiments firstly, electrode patterns 2a and 2b corresponding to the lower-part electrodes of the capacitor and a wiring pattern 3 corresponding to the part of the coil are formed on an insulating substrate 1. Secondly, the backside conductive pads 4 and 5 for connecting wires to the backside of the insulating substrate 1 are formed. As shown in FIG. 1B, pads 6 and 7 electrically conducted with the backside conductive pads 4 and 5 are formed on the backside of the insulating substrate 1 and electrically connected to each other with a connection wiring pattern 8.

Figure 2:
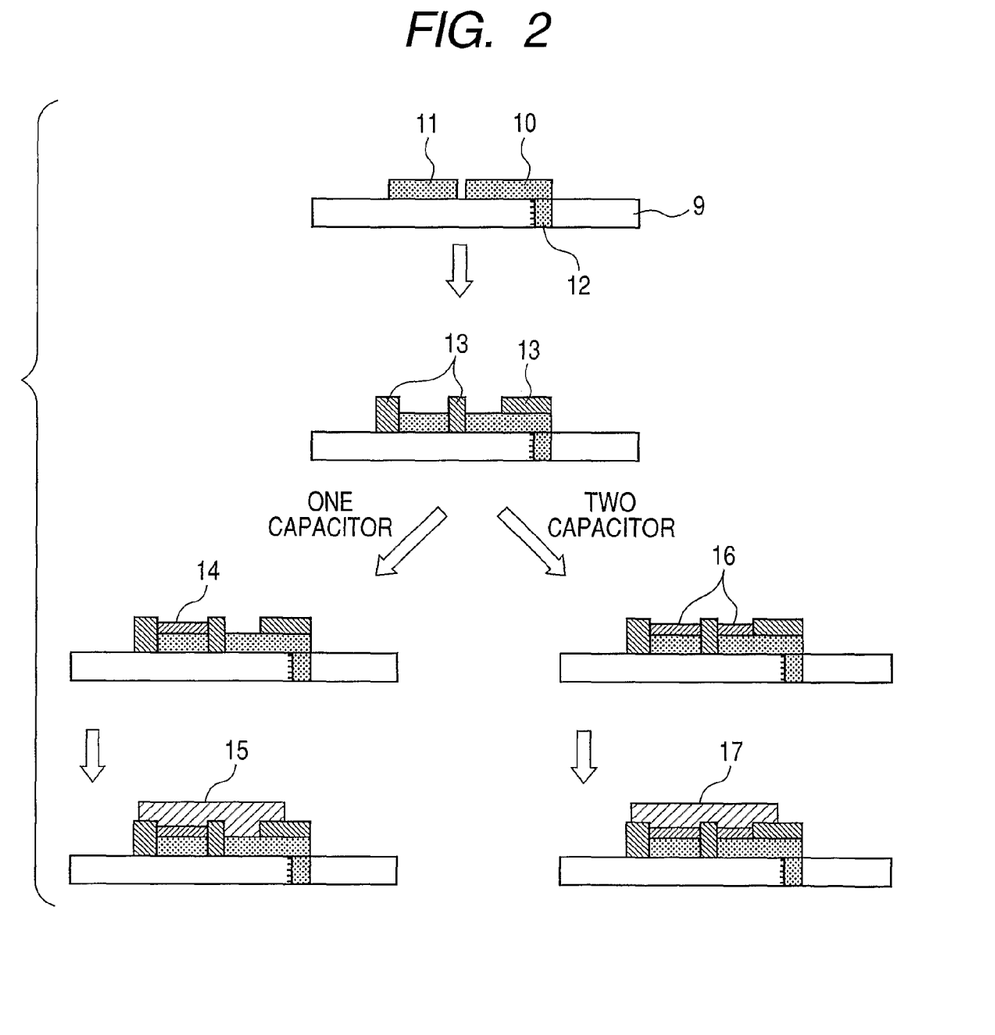
FIG. 2 is a schematic cross section showing one example of the resonance tag.
Figure 3:
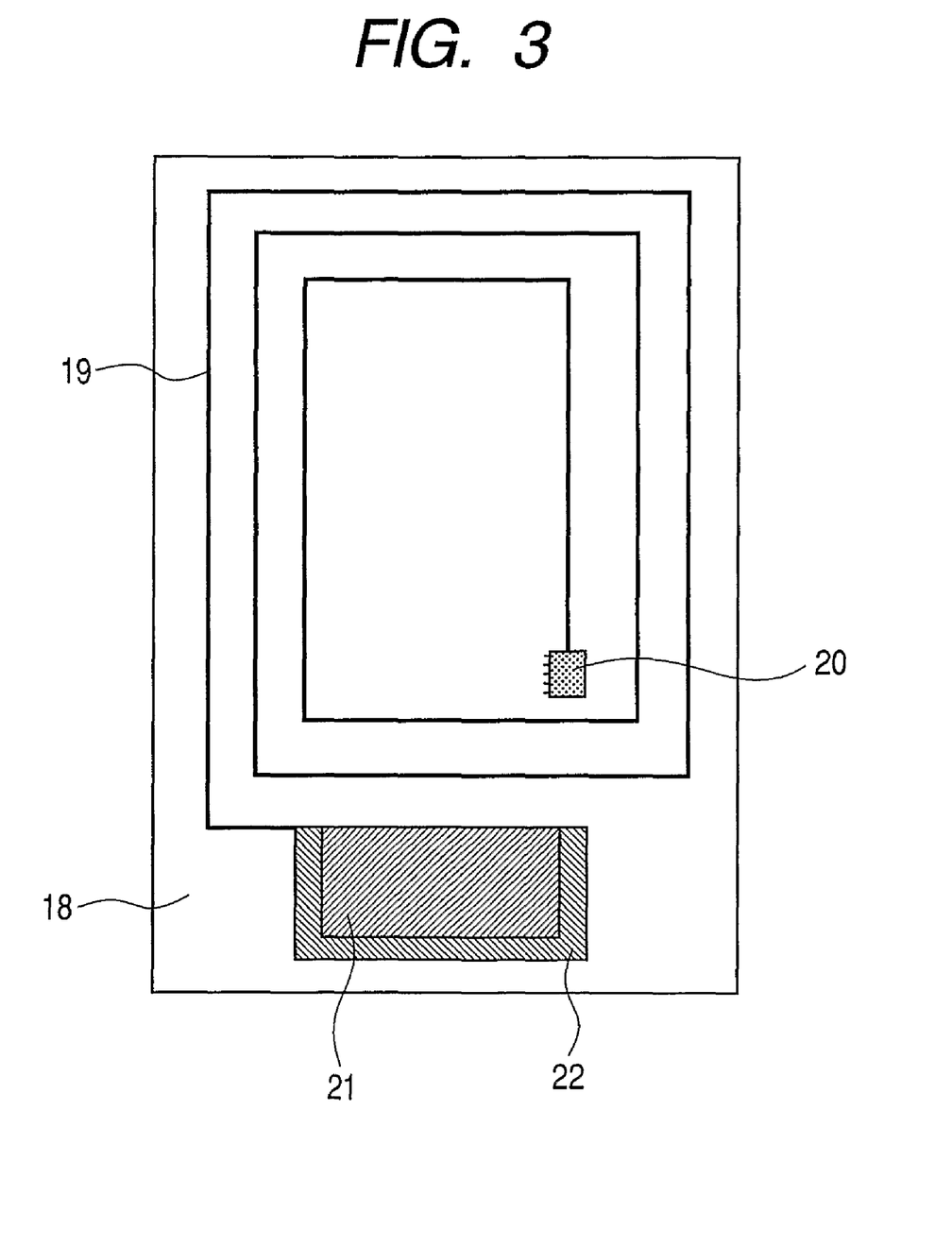
FIG. 3 is a schematic view showing a final product of the resonance tag.

The resonance tag is described below using a cross section shown in FIG. 2. Electrode patterns 10 and 11 arranged on an insulating substrate 9 and a conduction VIA 12 for connecting wires to the backside are formed. As shown in FIG. 2, an insulating resist layer 13 is stacked with the screen printing method. A remaining area of the electrode pattern 10 which has not been covered with the resist layer is an electrode area of the capacitor, so that the adequate adjustment of the area at this point allows a capacitor to have a desired capacitance. By covering the peripheral portions of the electrode patterns with the resist layer 13, there is obtained an effect of preventing an electric short circuit at a conductive-paste applying process which is a post fabrication process. After that, the resist layer was subjected to a heating treatment at 150° C. for 25 minutes to be hardened.

When one capacitor is formed, a dielectric film 14 is formed at a predetermined position through a metal mask by a spattering method. At this stage, an adequate adjustment of thickness of the dielectric film 14 and the aforementioned electrode area allows the capacitor to have a desired capacitance. This permits a resonance frequency to be set to a desired frequency region. The dielectric film is preferably 1 nm or more to 1000 nm or less in thickness, more preferably, 5 nm or more to 100 nm or less. This is because an excessively thin dielectric film causes an irreversible dielectric breakdown or increases an initial defective fraction of the capacitor. On the other hand, an excessively thick dielectric film increases a voltage required for inducing a reversible change in the capacitance of the capacitor. It does not matter if the order of processes for applying the insulating resist and forming the dielectric film is reversed.

Figure 4A:
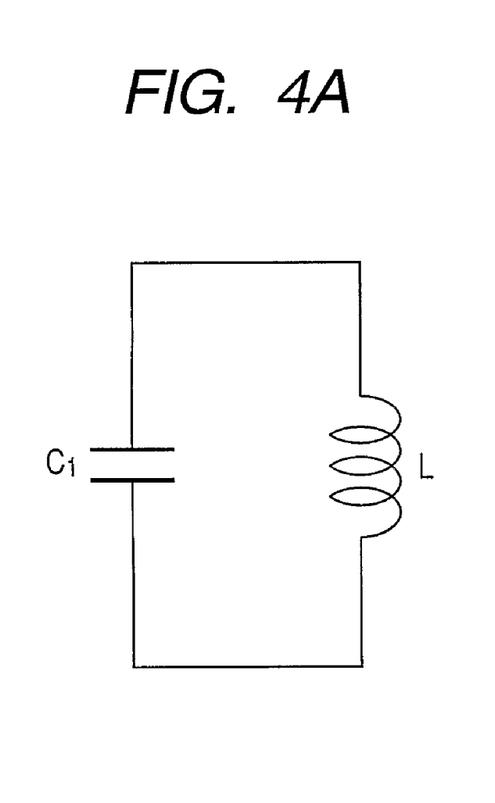
FIG. 4A is an equivalent circuit diagram showing one example of the resonance tag composed of one capacitor and one coil.

Finally, a conductive paste 15 is stacked by using a screen printing method on a predetermined position to form the capacitor portion. Resultantly, an LC resonance circuit is formed as shown in an equivalent circuit diagram of FIG. 4 in which a coil is connected to a capacitor with a wire. A material for the conductive paste may be selected from gold, silver, copper, carbon and the like. It is, however, preferable to select a material having a resistance as low as possible in order to maintain a good Q factor of a resonance characteristic.

Figure 4B:
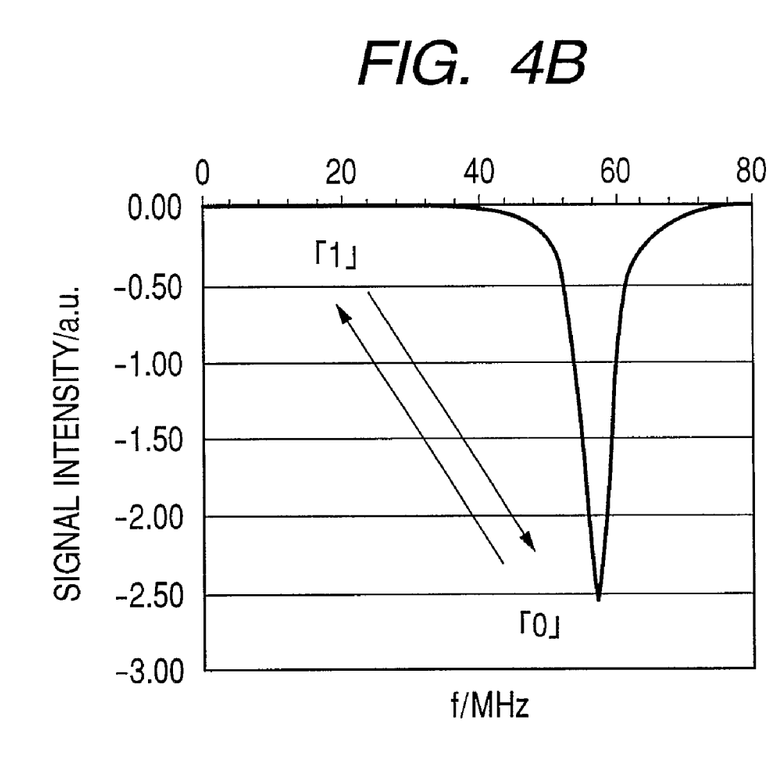
FIG. 4B is a graph showing the resonance characteristics of the resonance tag of FIG. 4A in a relationship between the resonance frequencies and signal intensity of the resonance tag.

A resonance frequency of the resonance tag including the LC circuit formed in such the manner was measured by using a Network Analyzer (trade name: HP8753E) produced by Hewlett Packard. In practice, the resonance characteristic shown in FIG. 4B is typically observed. As a voltage applying device for generating an induced electromotive force inside a circuit of the resonance tag, an antenna coil prepared separately and a pulse generator connected thereto were used. Electromagnetic waves emitted from the antenna coil in the device interact with the antenna of the resonance tag to generate an induced electromotive force. The voltage described hereinafter referred to the peak-to-peak value of a sine wave outputted from the pulse generator to the antenna coil.

Figure 5:
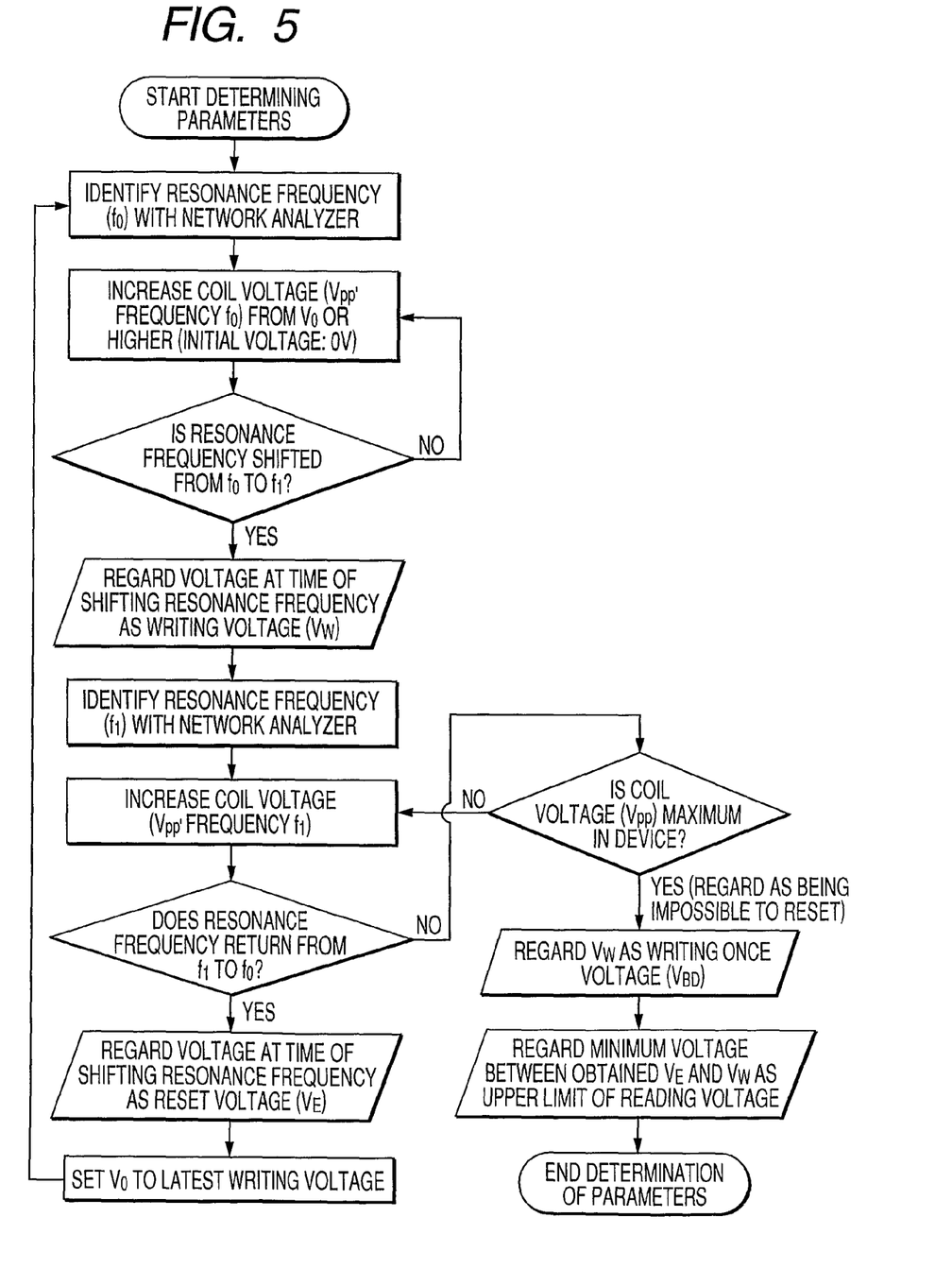
FIG. 5 is a flowchart as one example for determining a writing voltage, a resetting voltage, a write-once voltage, and a reading voltage.

An experiment on a voltage application to the tag was conducted according to the flowchart shown in FIG. 5 to determine parameters such as an initial resonance frequency ($f_0$) of the resonance tag, a resonance frequency ($f_1$) shifted by applying a voltage, a writing voltage ($V_{W1}$) as a voltage at which the resonance frequency is shifted, a resetting voltage ($V_E$) for returning the resonance frequency to an initial state, a write-once voltage ($V_{BD}$) at which the resonance frequency can not be returned any longer, and a reading voltage ($V_R$) used for reading out information on the resonance tag. Experimental results are summarized in Table 1.

TABLE 1

| Parameters | |
|---|---|
| Resonance frequency ($f_0$)/MHz | 57.1 |
| Resonance frequency ($f_1$)/MHz | No resonance peak |
| Frequency after reset/MHz | 57.1 |
| Writing voltage ($V_{W1}$)/V | 5 |
| Resetting voltage ($V_E$)/V | 10 |
| Write-once voltage ($V_{BD}$)/V | 16 |
| Reading voltage ($V_R$)/V | >5 |

Table 1 shows results on the experiment in which alumina was used as the dielectric film and silver paste was used as the conductive paste. As can be seen from Table 1, the initial resonance frequency of the resonance tag was 57.1 MHz. The application of a writing voltage of 5 volts (with a frequency 52.5 MHz) changed the capacitance of the capacitor to cause a resonance peak to disappear. Then, the application of a resetting voltage of 10 volts caused the resonance peak to appear again. The frequency was returned to the initial frequency of 57.1 MHz. For this reason, it can be determined that a reading voltage for reading out information of the resonance tag is appropriately a voltage of less than 5 volts at which the tag does not write information. In the case of application of a write-once voltage of 16 volts, it proved that the resonance frequency could not return to the initial frequency any more after the resonance peak disappeared. Therefore, as shown in FIG. 4B, allocating two pieces of specific information "0" and "1" to, for example, the vicinity of 57.1 MHz and to a state in which the resonance peak disappears enables rewriting information from "0" to "1" by a writing operation and "1" to "0" by a resetting operation, as described in claim 2. Alternatively, since the sharpness Q of the resonant peak ($=2\pi fL/R$, where f is a resonance frequency, L is a reactance, and R is a resistance) varies in the same manner as the above, this parameter may be used as specific information.

That is to say, in the first embodiment, a specific threshold voltage at which variation in the capacitance of a capacitive element is made irreversible thereby making a reset operation impossible is 16 volts. Incidentally, radiating electromagnetic waves in time of writing outside the range of resonant-peak band of the tag could not effectively induce electromotive force into the circuit, so that the resonant peak did not disappear even after electromagnetic waves were radiated for several minutes. For this reason, the frequencies of radiated electromagnetic waves are preferably within the frequency band of the specific resonant peak of the resonance circuit in order to rewrite information of a usable tag.

Second Embodiment

An embodiment in which a resonance tag composed of one coil and two capacitors connected in series is described with reference to FIG. 2. The resonance tag is produced in the same steps as those described in the first embodiment, except that two capacitors are formed, so that detailed description is omitted.

Only step of forming two capacitors is described with reference to the right hand branch shown in FIG. 2.

When two capacitors are formed, a dielectric film 16 (with a film thickness of 10 nm) is formed at two predetermined positions as shown in the cross-sectional view through a metal mask by a spattering method.

Figure 6A:
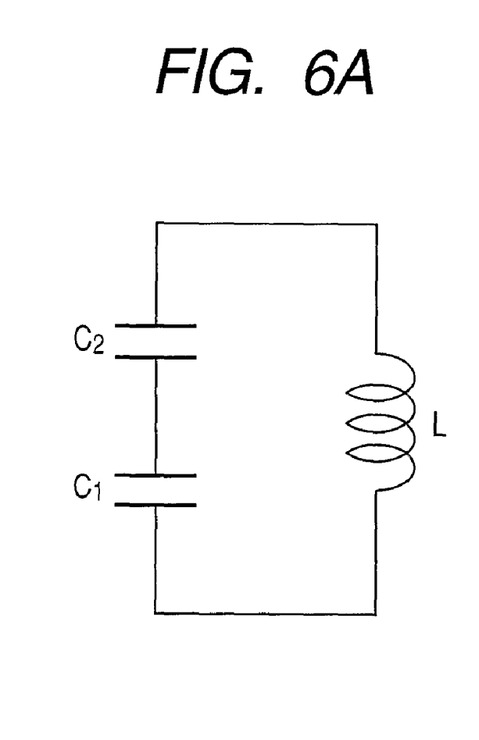
FIG. 6A is an equivalent circuit diagram showing one example of the resonance tag composed of two capacitors and one coil.

Subsequently, a conductive paste 17 is stacked on two predetermined positions by using a screen printing method to form the capacitor portion. An LC resonance circuit is resultantly formed, as shown in an equivalent circuit of FIG. 6A in which one coil and two capacitors are connected in series with a wire.

An experiment on a voltage application to the tag was conducted according to the flowchart shown in FIG. 5 to determine parameters in the same manner as in the first embodiment. For two capacitors, shift in resonance frequency occured in two steps, so that the resonance frequency shifted at the second step is regarded as $f_2$ and the writing voltage required for the second step was regarded as $V_{W2}$. Experimental results are summarized in Table 2.

TABLE 2

| Parameters | |
|---|---|
| Resonance frequency ($f_0$)/MHz | 54.7 |
| Resonance frequency ($f_1$)/MHz | 22.1 |
| Resonance frequency ($f_2$)/MHz | No resonance peak |
| Frequency after reset/MHz | 53.5 |
| Writing voltage ($V_{W1}$)/V | 7 |
| Writing voltage ($V_{W2}$)/V | 7 |
| Resetting voltage ($V_E$)/V | 9 |
| Write-once voltage ($V_{ED}$)/V | 15 |
| Reading voltage ($V_R$)/V | >7 |

Figure 6B:
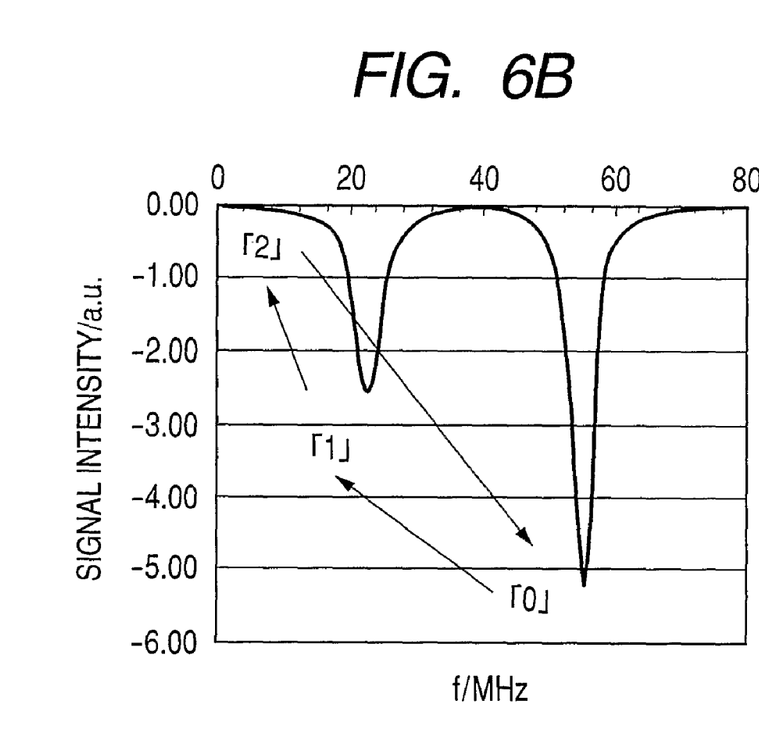
FIG. 6B is a graph showing the resonance characteristics of the resonance tag of FIG. 6A in a relationship between the resonance frequencies and signal intensity of the resonance tag.

Table 2 shows results on the experiment in which alumina was used as the dielectric film and silver paste was used as the conductive paste. As can be seen from Table 2, the initial resonance frequency of the resonance tag was 54.7 MHz. The application of a writing voltage of 7 volts (with a frequency of 52.5 MHz) changed the capacitance of the capacitor to cause a resonance peak to shift to 22.1 MHz. Applying again a writing voltage of 7 volts (with a frequency of 22.1 MHz) changed the capacitance of the capacitor to causes the resonance peak to disappear. Then, the application of a resetting voltage of 9 volts (with a frequency of 22.1 MHz) caused the resonance peak to appear again. The frequency was substantially returned to 53.5 MHz, i.e., to the initial state. For this reason, it can be determined that a reading voltage for reading out information of the resonance tag is appropriately a voltage of less than 7 volts at which the tag does not write information. In the case of application of a write-once voltage of 15 volts, it proved that the resonance frequency could not return to the initial frequency any more after the resonance peak disappeared. Therefore, as shown in FIG. 6B, allocating three pieces of specific information "0", "1" and "2" to, for example, the vicinities of 54.7 MHz, 22.1 MHz and to a state in which the resonance peak disappears, respectively, enables rewriting information from "0" to "1" and "1" to "2" by a writing operation and "2" to "0" by a resetting operation, as described in claim 2.

That is to say, in the second embodiment, a threshold voltage at which variation in the capacitance of the capacitor is made irreversible is 16 volts. When frequencies of radiated electromagnetic waves were outside the frequency band of the resonance frequency of the resonance circuit, information was not rewritten. For that reason, when a plurality of resonance circuits having different resonance frequencies are arrayed on various circuit boards, radiating electromagnetic waves corresponding to respective resonance frequencies enables independent writing and erasing.

First Comparative Embodiment

Measurements were conducted on characteristics of the resonance tag when it was left to stand under the atmosphere for 1 hour, 24 hours and 48 hours without using the voltage applying means in the first embodiment and on characteristics of the resonance tag when it was left to stand similarly under the atmosphere for 1 hour, 24 hours and 48 hours after the resonance frequency was shifted by the application of a writing voltage of 5 volts. Finally, a resetting voltage of 10 volts for initializing the resonance frequency was applied. Table 3 summarizes the results.

TABLE 3

| Hours for which the resonance tag was left to stand | Resonance frequencies/MHz |
|---|---|
| 1 hour | 57.1 |
| 24 hours | 57.1 |
| 48 hours | 57.1 |
| 1 hour after application of $V_{w1}$ | No resonance peak |
| 24 hours after application of $V_{w1}$ | No resonance peak |
| 48 hours after application of $V_{w1}$ | No resonance peak |
| Application of $V_E$ | 57.0 |

As can be seen from Table 3, the initial resonance frequency of the resonance tag was 57.1 MHz, and was not shifted by merely leaving the tag to stand under the atmosphere for 1 hour, 24 hours and 48 hours. An experiment on the tag being left to stand under the atmosphere was conducted after information was written by applying a writing voltage of 5 volts (with a frequency of 52.5 MHz), that is to say, after the resonance peak was caused to disappear after the tag was left to stand for 48 hours. Spontaneous return of the resonance peak was not observed after the tag was left to stand for 1 hour, 24 hours and 48 hours. Application of the resetting voltage of 10 volts (with a frequency of 22.1 MHz) after the tag was left to stand for 48 hours after the writing caused a resonance peak to return at a resonance frequency of 57.0 MHz.

From the first comparative embodiment, it is clear that the application of a voltage according to the present invention is required to write information into and erase it from the resonance tag according to the present invention.

Second Comparative Embodiment

Measurements were conducted on characteristics of the resonance tag when it was left to stand under the atmosphere for 1 hour, 24 hours and 48 hours without using the voltage applying means in the second embodiment and on characteristics of the resonance tag when it was left to stand under the atmosphere for 1 hour, 24 hours and 48 hours, after the resonance frequency was shifted by the first application of a writing voltage of 7 volts. Next, after the resonance frequency was shifted by the second application of a writing voltage of 7 volts, measurements were conducted on characteristics of the resonance tag when it was left to stand under the atmosphere for 1 hour, 24 hours and 48 hours. Finally, a resetting voltage of 9 volts for initializing the resonance frequency was applied. Table 4 summarizes the results.

TABLE 4

| Hours for which the resonance tag was left to stand | Resonance frequencies/MHz |
|---|---|
| 1 hour | 54.7 |
| 24 hours | 54.7 |
| 48 hours | 54.7 |
| 1 hour after application of $V_{w1}$ | 22.1 |
| 24 hours after application of $V_{w1}$ | 22.1 |
| 48 hours after application of $V_{w1}$ | 22.1 |
| 1 hour after application of $V_{w2}$ | No resonance peak |
| 24 hours after application of $V_{w2}$ | No resonance peak |
| 48 hours after application of $V_{w2}$ | No resonance peak |
| Application of $V_E$ | 54.4 |

As can be seen from Table 4, the initial resonance frequency of the resonance tag was 54.7 MHz, and was not shifted by merely leaving the tag to stand under the atmosphere for 1 hour, 24 hours and 48 hours. An experiment on the tag being left to stand under the atmosphere was conducted after information was written by applying a writing voltage of 7 volts, that is to say, after the resonance frequency was shifted to 22.1 MHz. Return of the resonance frequency to the initial state was not observed after the tag was left to stand for 1 hour, 24 hours and 48 hours. Further the tag was left to stand under the atmosphere after the resonance peak caused to disappear by the second application of a writing voltage of 7 volts. Result is the same as the above. Spontaneous return of the resonance peak was not observed either. When a resetting voltage of 9 volts has been applied, the return of the resonance peak with a resonance frequency of 54.4 MHz was observed.

From the second comparative embodiment, it is found that a resonance tag in which two capacitors are connected in series and three or more pieces of information can be written is capable of intentionally and reversibly writing and erasing information. It is also clear that the application of voltage according to the present invention is required for the above purpose.

According to the present invention, it is possible to reversibly control information previously allocated to resonant characteristics of the resonance tag, in other words, frequency or peak sharpness, which allows providing a reusable shoplifting preventing tag, non-contact information rewritable card, and inexpensive chipless ID tag.

According to a preferable embodiment of the present invention, a capacitive element can be provided, applicable to various rewritable device in addition to the resonance tag.

This application claims priority from Japanese Patent Application No. 2005-009071 filed on Jan. 17, 2005, which is hereby incorporated by reference herein.

The invention claimed is:

1. A resonance tag comprising:
   a substrate; and
   a resonance circuit on the substrate, the resonance circuit having a capacitive element and an inductive element, wherein the capacitive element comprises at least first and second capacitors,
   wherein the first and second capacitors are arranged side-by-side along a plane of the substrate,
   wherein the first and second capacitors and the inductive element are all connected in series with a single conduction element for both of said first and second capacitors, and
   wherein a capacitance of the capacitive element is reversibly changed when a voltage applied to the element is not more than a threshold voltage of the capacitive element, and a capacitance of the capacitive element is irreversibly changed when voltage applied to the capacitive element is more than the threshold voltage of the capacitive element.

2. The resonance tag according to claim 1, wherein specific information is allocated to a value of resonance characteristic of the resonance circuit corresponding to a reversible change in the capacitance, and different specific information is allocated to a value of resonance characteristic corresponding to each change in state of the resonance characteristic.

3. The resonance tag according to claim 1, wherein each of the first and second capacitors comprises:
   a first conduction element mounted on the substrate;
   a dielectric layer provided on the first conduction element; and
   an insulating resin layer provided so as to cover at least the periphery of the first electrode and the dielectric layers,
   wherein the single conduction element comprises a second conduction element for both of the first and second capacitors and is provided on the dielectric layer and the insulating resin layer.

4. The resonance tag according to claim 3, wherein the dielectric layer is an alumina thin film.

5. A resonance tag array comprising a plurality of resonance tags according to claim 1 on a second substrate formed of a material selected from the group consisting of plastic, glass and paper.

6. A method of reversibly changing resonance characteristic of the resonance tag according to claim 1, comprising:
   a writing operation for changing the resonance characteristic from an initial state to another state by a first applied voltage;
   a resetting operation for returning the change to the initial state by a second applied voltage; and
   a detecting operation for detecting the resonance characteristic performed at an applied voltage lower than voltages at which the writing and resetting operations are performed,
   wherein each of the applied voltages is set to a value at which the capacitance of the capacitive element is reversibly changed.

7. The method of reversibly changing the resonance characteristic according to claim 6, wherein the applied voltage is an induced electromotive force generated in a circuit by radiating an electromagnetic wave from the outside and a frequency of the radiated electromagnetic wave is within a frequency band of a specific resonance peak of the resonance circuit.

8. The method of reversibly changing the resonance characteristic according to claim 6, wherein the applied voltage is applied by directly contacting a voltage applying device to the contact portion of the circuit.

* * * * *